US008237085B2

(12) United States Patent
Tanaka

(10) Patent No.: US 8,237,085 B2
(45) Date of Patent: Aug. 7, 2012

(54) BEAM HOMOGENIZER, LASER IRRADIATION APPARATUS, AND LASER IRRADIATION METHOD

(75) Inventor: Koichiro Tanaka, Kanagawa (JP)

(73) Assignee: Semiconductor Energy Laboratory Co., Ltd., Kanagawa-Ken (JP)

(*) Notice: Subject to any disclaimer, the term of this patent is extended or adjusted under 35 U.S.C. 154(b) by 1301 days.

(21) Appl. No.: 11/939,649

(22) Filed: Nov. 14, 2007

(65) Prior Publication Data

US 2008/0118203 A1    May 22, 2008

(30) Foreign Application Priority Data

Nov. 17, 2006   (JP) ................................. 2006-311077

(51) Int. Cl.
*B23K 26/06* (2006.01)
(52) U.S. Cl. .................................................. 219/121.74
(58) Field of Classification Search ............. 219/121.73, 219/121.74; 385/31, 33, 34, 15, 133; 359/201.2, 359/213.1, 214.1, 232, 234
See application file for complete search history.

(56) References Cited

U.S. PATENT DOCUMENTS

| 5,594,175 | A  * | 1/1997 | Lyon et al. ..................... 73/593 |
| 2004/0052279 | A1 | 3/2004 | Miyairi et al. |
| 2004/0058553 | A1 | 3/2004 | Tanaka |
| 2004/0160582 | A1 * | 8/2004 | Lof et al. ....................... 355/30 |
| 2004/0179807 | A1 | 9/2004 | Tanaka |
| 2004/0213514 | A1 * | 10/2004 | Tanaka et al. .................. 385/31 |
| 2005/0032385 | A1 * | 2/2005 | Ito .................................. 438/710 |
| 2005/0111497 | A1 * | 5/2005 | Tanaka ............................. 372/9 |
| 2005/0252894 | A1 * | 11/2005 | Imai et al. ................ 219/121.78 |
| 2005/0284225 | A1 * | 12/2005 | Luo ................................. 73/593 |
| 2006/0072877 | A1 * | 4/2006 | Tanaka et al. .................. 385/39 |

FOREIGN PATENT DOCUMENTS

| DE | 19616863 A1 * | 10/1996 |
| JP | 59-150684 A * | 8/1984 |
| JP | 4-061319 | 2/1992 |
| JP | 8-66781 A * | 3/1996 |
| JP | 8-338962 A * | 12/1996 |
| JP | 2001-178434 | 7/2001 |
| JP | 2004-134785 | 4/2004 |
| JP | 2004-354671 | 12/2004 |
| WO | WO 2006/022196 A1 | 3/2006 |

OTHER PUBLICATIONS

Machine translation of Japan Patent document No. 8-338,962, Oct. 2011.*

* cited by examiner

*Primary Examiner* — Geoffrey S Evans
(74) *Attorney, Agent, or Firm* — Nixon Peabody, LLP; Jeffrey L. Costellia

(57) ABSTRACT

An effect of interference is eliminated and intensity of a laser beam is homogenized. The beam homogenizer 100 includes reflecting mirrors 103 and 104 which are provided so that reflecting surfaces thereof face each other. The laser beam LB propagates through a space between the reflecting mirrors 103 and 104 while being reflected therebetween, so that intensity distribution of the laser beam LB is homogenized, but the laser beam LB also interferes. The first reflecting mirror 103 and the second reflecting mirror 104 are oscillated in a direction perpendicular to a direction in which the laser beam LB is scanned, intensity distribution of the laser beam LB in an oscillation direction is temporally averaged.

17 Claims, 10 Drawing Sheets

BEAM HOMOGENIZER, LASER IRRADIATION APPARATUS, AND LASER IRRADIATION METHOD

BACKGROUND OF THE INVENTION

1. Field of the Invention

The present invention relates to an apparatus and a method for irradiating a subject to be irradiated with a laser beam and also relates to the beam homogenizer used for a laser beam irradiation apparatus.

2. Description of the Related Art

In order to form an integrated circuit with a thin film transistor (hereinafter referred to as a TFT) having high mobility over a glass substrate, an amorphous silicon film is deposited over the glass substrate by a CVD method or the like and the amorphous silicon film is applied with heat energy to be crystallized, so that a crystalline silicon film is formed. For crystallizing the amorphous silicon film, laser annealing is used to avoid transformation of the glass substrate by heat.

A crystalline structure of the crystalline silicon film crystallized by laser annealing depends on intensity of a laser beam. In a case where an amorphous silicon film is completely melted by laser beam irradiation, an interface between a solid phase (portion which is not melted) and a liquid phase (portion which is melted) moves in the silicon film at the same time as scanning with the laser beam, and thus crystal growth proceeds in a scanning direction and the crystalline silicon film having a large grain size can be formed. On the other hand, in a case where intensity of a laser beam is low and the amorphous silicon film is not completely melted but only a surface thereof is melted, numerous crystal cores are randomly generated at an interface between the silicon film and a base and crystals grow toward a surface of the silicon film from the crystal cores at the interface; therefore, the crystalline silicon film having a grain size smaller than that in the case where the amorphous silicon film is completely melted can be formed. When intensity of a laser beam is too low, the amorphous silicon film cannot be crystallized. When intensity of a laser beam is too high, the silicon film is ablated.

Therefore, in order to crystallize the amorphous silicon film by laser annealing, it is needed that the amorphous silicon film be applied with heat energy homogeneously with appropriate intensity by a laser beam. Under such conditions, the crystalline silicon film with a homogeneous crystalline structure and a large grain size can be formed over the glass substrate.

For improving throughput of laser annealing, a beam emitted from a laser oscillator is extended in one direction to be condensed in a direction perpendicular to an extension direction so as to be processed into a linear beam, by an optical system. Intensity distribution of the beam emitted from the laser oscillator is not homogeneous. For example, a laser beam of a single mode has Gaussian distribution in which intensity is higher toward the center of a curve. Even when the laser beam is processed into a linear shape, intensity distribution of the laser beam is still Gaussian distribution, and intensity of the ends of the laser beam is not high enough to melt amorphous silicon completely. Therefore, even when the amorphous silicon film is crystallized by such a linear laser beam, a periodical striped pattern occurs in the obtained crystalline silicon film due to a difference in the crystalline structure. By forming TFTs with such crystalline silicon films, each TFT has a different electrical characteristic due to a difference in the crystalline structure.

The inventor of the present invention developed a beam homogenizer for homogenizing intensity distribution of a laser beam (see FIG. 1 of Patent Document 1: Japanese Published Patent Application No. 2004-134785). The beam homogenizer shown in FIG. 1 of Patent Document 1 is described with reference to FIGS. 12A and 12B. FIGS. 12A and 12B are plan views of the beam homogenizer. FIG. 12B is a plan view of a plane seen from a direction perpendicular to that in FIG. 12A.

The beam homogenizer includes reflecting mirrors 11 and 12 which are rectangular and provided so that reflecting surfaces thereof face each other. A beam 13 which has entered the beam homogenizer propagates through the space between the reflecting mirrors 11 and 12 while being repeatedly reflected by the reflecting mirrors 11 and 12 as shown by the solid arrows and then is emitted from the beam homogenizer. On a plane P including an exit of the beam homogenizer, an irradiation region of the beam 13 is a region 14 corresponding to the exit of the beam homogenizer. When the beam homogenizer is not provided in a light path, the beam 13 propagates through a space as shown by the dotted arrows, and on the plane P, an irradiation region of the beam 13 is a region 15. That is, the beam 13 reaching regions 15a and 15b in the irradiation region 15 (the irradiation region when the beam homogenizer is not provided) is made to reach the irradiation region 14 by the beam homogenizer.

With the beam homogenizer, an incident beam is propagated while being reflected, thereby being split into a plurality of beams. All the split beams overlap each other at the exit and thus intensity distribution of the beam is homogenized.

Further, the inventor of the present invention developed an optical system of a laser irradiation apparatus for processing a laser beam into a linear shape and eliminating an adverse effect due to the fact that intensity distribution of the laser beam is Gaussian distribution (for example, Patent Document 2: PCT International Publication No. 2006/022196). In Patent Document 2, by making a laser beam pass through a slit so that the ends of the laser beam are shielded, a low intensity portion of the laser beam is avoided to be delivered. That is, in Patent Document 2, by an optical system including the slit, heat energy which is high enough to reliably carry out crystallization and to obtain a crystal with a large grain size is supplied to the amorphous silicon film.

SUMMARY OF THE INVENTION

In order to improve an advantageous effect of homogenization of intensity distribution by the beam homogenizer shown in FIGS. 12A and 12B, it is only necessary that a light path of a beam be extended and the number of reflections of the beam be increased. However, extension of the light path and repeated reflections between the reflecting mirrors 11 and 12 result in interference of the laser beam. A laser beam of the single mode, which is used for laser annealing, tends to interfere as compared to a laser of a multi mode.

When a laser beam interferes by the beam homogenizer, intensity distribution of the laser beam at the exit of the beam homogenizer periodically fluctuates, which is recognized as a fringe on a surface to be irradiated. In a case where by interference, a portion of the laser beam, of which intensity is not high enough to completely melt the amorphous silicon film, occurs periodically on the surface to be irradiated, a crystalline structure of a crystalline silicon film reflects intensity distribution of the laser beam when the amorphous silicon film is crystallized by such a laser beam; therefore, a striped pattern occurs in the crystalline silicon film.

In addition, the optical system using a slit, which is as described in Patent Document 2, has a problem of diffraction. By diffraction, intensity of the vicinity of the ends of the laser beam might be not high enough or too high to completely melt the amorphous silicon film.

The beam homogenizer and the slit in FIGS. 12A and 12B are significant optical components for processing a subject to be irradiated by a laser beam. However, when a laser beam is used for irradiation light, interference and diffraction are inevitable physical phenomena. Here, an object of the present invention is to provide a beam homogenizer, a laser irradiation apparatus, and a laser irradiation method by which action of laser beam irradiation can be brought to an object to be irradiated uniformly and reliably by laser beam irradiation even when interference or diffraction occurs by an optical component.

The present invention is to average intensity distribution of a laser beam temporally by oscillating the optical component by which interference or diffraction occurs, so that the intensity distribution of the laser beam is homogenized. Further, the present invention is to average intensity distribution of a laser beam temporally by oscillating a lens for projection on a surface to be irradiated and making the laser beam which interferes or is diffracted by the optical component pass through the oscillating lens, so that the intensity distribution of the laser beam is homogenized.

The present invention is a beam homogenizer used for a laser irradiation apparatus, which includes a first reflecting mirror and a second reflecting mirror which are provided so that reflecting surfaces thereof face each other. The first reflecting mirror and the second reflecting mirror are oscillated.

The laser irradiation apparatus of the present invention includes the beam homogenizer in an optical system. The optical system includes a beam homogenizer in which a first reflecting mirror and a second reflecting mirror are to be oscillated and a projection lens provided on an exit side of the beam homogenizer. Further, the projection lens may be oscillated.

An optical system of another laser irradiation apparatus of the present invention includes a beam homogenizer in which a first reflecting mirror and a second reflecting mirror are to be oscillated, a slit provided on an exit side of the beam homogenizer, and a projection lens provided on an exit side of the slit.

Another laser irradiation apparatus of the present invention includes a slit to be oscillated in an optical system. The optical system includes the slit to be oscillated and a projection lens provided on an exit side of the slit. The projection lens may be oscillated.

Another laser irradiation apparatus of the present invention includes a projection lens to be oscillated in an optical system. The optical system includes a beam homogenizer including a first reflecting mirror and a second reflecting mirror which are provided so that reflecting surfaces thereof face each other, and the projection lens to be oscillated which is provided on an exit side of the beam homogenizer.

Another laser irradiation apparatus of the present invention includes a projection lens to be oscillated in an optical system. The optical system includes a slit and the oscillating projection lens to be oscillated which is provided on an exit side of the slit.

In a case of using a continuous wave laser or a pseudo continuous wave laser for a laser oscillator, a frequency of oscillation of a beam homogenizer, a slit, and a projection lens f, a scanning velocity of a laser beam on a surface to be irradiated V, and a length of the laser beam in a scanning direction on the surface to be irradiated d satisfy $f \geq V/d$. When $f \geq V/d$ is satisfied, an advantageous effect that intensity distribution of the laser beam is temporally averaged becomes evident.

A laser irradiation method of the present invention is a laser irradiation method in which a laser beam passes through a beam homogenizer, and an object to be irradiated is irradiated with the laser beam which has passed through the beam homogenizer. The beam homogenizer includes a first reflecting mirror and a second reflecting mirror which are provided so that reflecting surfaces thereof face each other. The object to be irradiated is irradiated with the laser beam while the first reflecting mirror and the second reflecting mirror are oscillated.

In the laser beam oscillation method having the above structure, after ends of the laser beam which has passed through the beam homogenizer are shielded, the object to be irradiated can be irradiated with the laser beam. Alternatively, the object to be irradiated can be irradiated with the laser beam while the projection lens is also oscillated.

According to another laser irradiation method of the present invention, a laser beam passes through an oscillated slit and then an object to be irradiated is irradiated with the laser beam.

According to another laser irradiation method of the present invention, a laser beam passes through a beam homogenizer, the laser beam passes through an oscillated projection lens, and then an object to be irradiated is irradiated with the laser beam.

According to another laser irradiation method of the present invention, a laser beam passes through a slit, the laser beam which has passed through the slit passes through a projection lens, and then an object to be irradiated is irradiated with the laser beam.

In a case where a laser beam is emitted from a continuous wave laser apparatus or a pseudo continuous wave laser apparatus, a frequency of oscillation of a beam homogenizer, a slit, and a projection lens f, a scanning velocity of a laser beam on a surface to be irradiated V, and a length of the laser beam in a scanning direction on the surface to be irradiated d satisfy $f \geq V/d$. Therefore, an effect that intensity distribution of the laser beam is temporally averaged becomes evident.

In the beam homogenizer of the present invention, the first reflecting mirror and the second reflecting mirror oscillate and thus intensity distribution of a laser beam at the exit of the beam homogenizer can be temporally averaged. Therefore, by using the beam homogenizer to be oscillated of the present invention, a portion in which intensity is not sufficiently high due to interference can be eliminated from the intensity distribution of a laser beam so that the distribution is homogenized, which makes it possible to heat the object to be irradiated homogeneously by the laser beam.

According to the present invention, by oscillating the slit, fluctuation in the intensity distribution of the laser beam due to diffraction can be avoided or reduced. Therefore, the amount of heat energy necessary for an object to be irradiated can be reliably supplied by the laser beam by using the oscillating slit of the present invention; accordingly, the object to be irradiated can be homogeneously heated by the laser beam.

According to the present invention, by oscillating the projection lens, fluctuation in the intensity distribution of the laser beam due to interference and diffraction of the laser beam can be avoided or reduced. Therefore, the amount of heat energy necessary for an object to be irradiated can be reliably supplied by the laser beam by using the oscillating projection lens of the present invention; accordingly, the object to be irradiated can be homogeneously heated by the laser beam.

Thus, as in the present invention, a laser beam passes through an oscillated beam homogenizer, an oscillated slit, or an oscillated projection lens, and then an object to be irradiated is irradiated with the laser beam, so that an advantageous effect of heating with the laser beam in the object to be irradiated can be obtained uniformly and reliably. For example, in the case of crystallizing an amorphous silicon film by laser beam irradiation, a crystalline silicon film having a homogeneous crystalline structure can be formed according to the present invention.

BRIEF DESCRIPTION OF THE DRAWINGS

FIG. 3A shows a case of a linear motion in the same direction, FIG. 3B shows a case of a linear motion in different directions, FIG. 3C shows a case of a rotational motion in the same direction, and FIG. 3D shows a case of a rotational motion in different directions.

FIG. 6A shows a case of a linear motion in the same direction and FIG. 6B shows a case of linear motion in different directions.

FIG. 12B is a plan view in a direction perpendicular to that in FIG. 12A.

DETAILED DESCRIPTION OF THE INVENTION

The optical system of the laser irradiation apparatus and the laser irradiation method of the present invention are described with reference to the drawings. Although the invention will be fully described by way of embodiment modes and embodiments with reference to the accompanying drawings, it is to be understood by those skilled in the art that various changes and modifications can be made without departing from the spirit and scope of the invention. Therefore, the present invention should not be construed as being limited to the description in the following embodiment modes and embodiments.

Embodiment Mode 1

Figure 1:
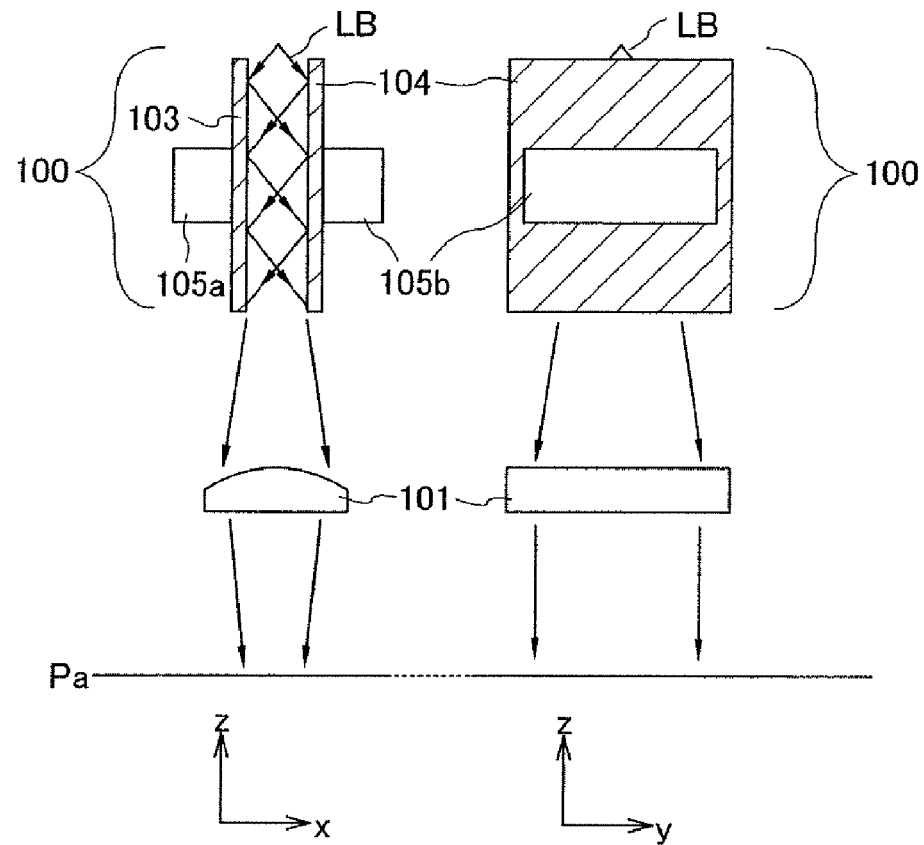
FIG. 1 is a plan view showing an x-z plane and a z-y plane of a structural example of an optical system including an oscillating beam homogenizer.

In this embodiment mode, an optical system having a beam homogenizer to be oscillated (or vibrated) is described. FIG. 1 is a plan view of the optical system of this embodiment mode. A plan view taken along x-z is shown on the left side and a plan view taken along z-y is shown on the right side. An x-direction, a y-direction, and a z direction are perpendicular to one another. FIG. 1 shows the optical system which has a surface to be irradiated, which is a plane parallel to an x-y plane, and performs scanning with a laser beam parallel in the y-direction.

Figure 2:
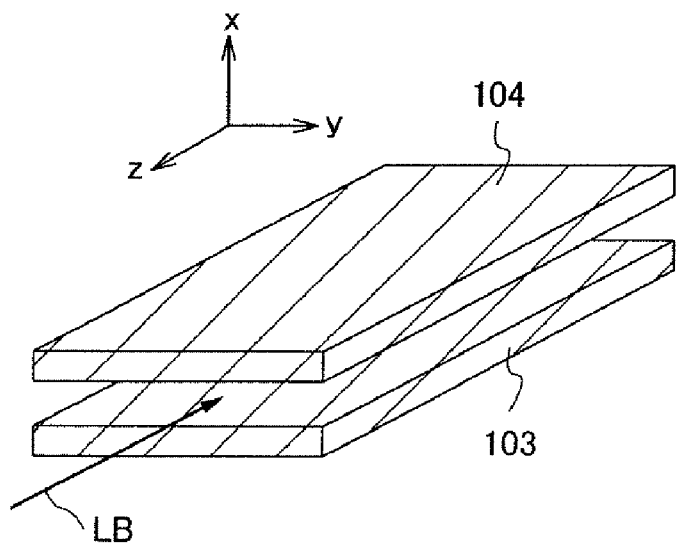
FIG. 2 is a three-dimensional perspective view of a beam homogenizer.

The optical system in FIG. 1 includes a beam homogenizer 100 and a projection lens 101. The beam homogenizer includes a first reflecting mirror 103 and a second reflecting mirror 104 which are rectangular. FIG. 2 is a three-dimensional perspective view of the beam homogenizer 100. An oscillator 105$a$ is mounted on the first reflecting mirror 103, and an oscillator 105$b$ is mounted on the second reflecting mirror 104. Oscillations of the oscillators 105$a$ and 105$b$ are transferred to the first reflecting mirror 103 and the second reflecting mirror 104 respectively so that the first reflecting mirror 103 and the second reflecting mirror 104 are oscillated. Piezoelectric elements may be used for the oscillators 105$a$ and 105$b$.

In the beam homogenizer 100, the first reflecting mirror 103 and the second reflecting mirror 104 are provided so that inner sides of the reflecting surfaces thereof face each other leaving a space in the x-direction. The distance between the first reflecting mirror 103 and the second reflecting mirror 104 is preferably 500 μm to 1 mm. FIG. 1 shows a state in which the reflecting surfaces of the first reflecting mirror 103 and the second reflecting mirror 104 face each other so as to be parallel to a z-y plane.

A laser beam LB which has entered between the first reflecting mirror 103 and the second reflecting mirror 104 propagates through a space between the first reflecting mirror 103 and the second reflecting mirror 104 while being reflected by the first reflecting mirror 103 and the second reflecting mirror 104 and then is emitted from between the first reflecting mirror 103 and the second reflecting mirror 104. That is, an optical waveguide is formed by the first reflecting mirror 103 and the second reflecting mirror 104.

The projection lens 101 is a lens for projecting an image of an exit of the beam homogenizer 100 on a plane Pa. The laser beam LB passing through the beam homogenizer 100 is projected on the plane Pa by the projection lens 101. The plane Pa corresponds to a surface to be irradiated of an object to be irradiated, and is parallel to the x-y plane. By the projection lens 101, the exit of the beam homogenizer 100 and the plane Pa which is to be irradiated are in a conjugate relation.

As described above, a laser beam passes through the beam homogenizer 100 (optical waveguide), which results in a fringe at the exit of the beam homogenizer 100. With the projection lens 101, the fringe is projected, and thus intensity distribution of the laser beam LB on the plane Pa reflects the fringe at the exit. Therefore, the object to be irradiated cannot be heated with temperature distribution homogeneous. In order to solve such a problem, the first reflecting mirror 103 and the second reflecting mirror 104 are oscillated by the oscillators 105$a$ and 105$b$, respectively. By oscillation, the fringe oscillates at the exit of the beam homogenizer 100; accordingly, intensity distribution of the laser beam LB in the x-direction at the exit is temporally averaged. That is, although intensity of the laser beam LB is periodically changed in the x-direction due to interference, a fluctuation range of intensity of the laser beam LB is reduced and intensity distribution of the laser beam LB in the x-direction is averaged by oscillation of the beam homogenizer 100. Thus, by oscillating the beam homogenizer 100, a portion in which intensity is not sufficiently high can be eliminated from the intensity distribution of the laser beam LB in the x-direction.

An image at the exit of the beam homogenizer 100 is projected on an object to be irradiated by the projection lens 101 as an image with homogeneous intensity distribution, and thus the object to be irradiated can be homogeneously heated by the laser beam LB.

For oscillation of the first reflecting mirror 103 and the second reflecting mirror 104, either a linear motion or a rotational motion in which a reflecting surface is tilted may be employed. It is only necessary that the fringe by the beam homogenizer 100 be oscillated on the plane Pa in a scanning direction of the laser beam LB (the y-direction) and a perpendicular direction (the x-direction).

Figure 3A:
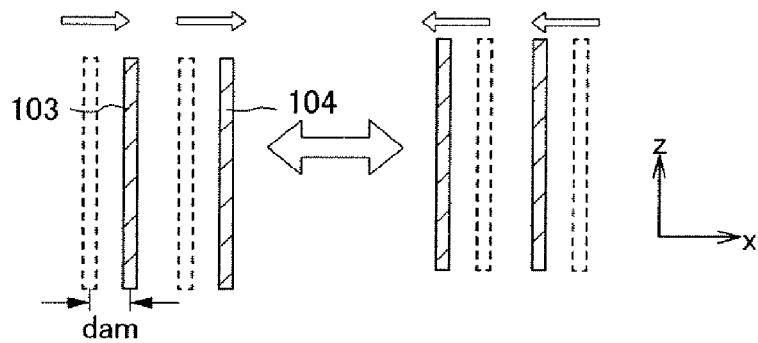
FIGS. 3A to 3D are explanatory diagrams showing oscillation of a beam homogenizer
Figure 3B:
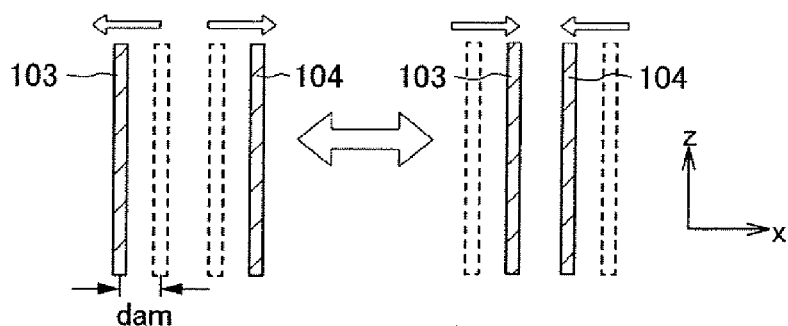

In the case where the first reflecting mirror 103 and the second reflecting mirror 104 are in a linear motion, a moving direction of the first reflecting mirror 103 may be the same as that of the second reflecting mirror 104 as shown in FIG. 3A or may be opposite to that of the second reflecting mirror 104 as shown in FIG. 3B. In the case of a rotational motion, the first reflecting mirror 103 and the second reflecting mirror 104 may be tilted in the same direction as shown in FIG. 3C or may be tilted in different directions as shown in FIG. 3D.

Figure 3C:
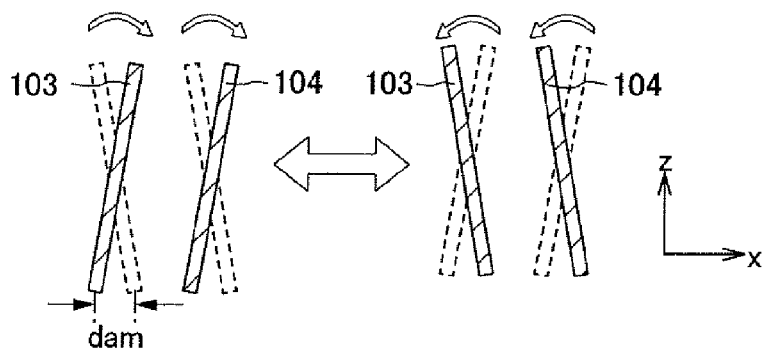
Figure 3D:
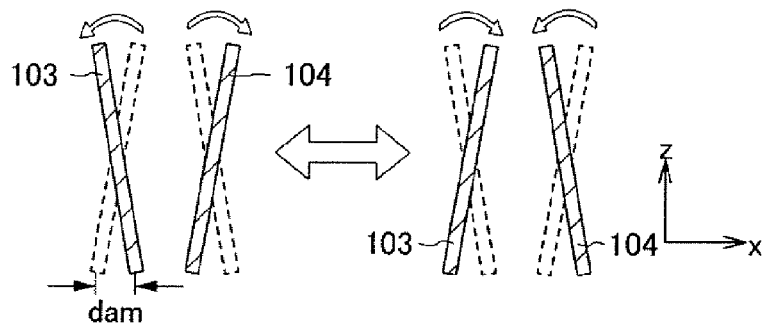

Note that oscillating the first reflecting mirror 103 and the second reflecting mirror 104 (or the beam homogenizer 100) in the same direction means moving the first reflecting mirror 103 and the second reflecting mirror 104 as shown in FIG. 3A or FIG. 3C. Meanwhile, oscillating the first reflecting mirror 103 and the second reflecting mirror 104 (or the beam homogenizer 100) in different directions means moving the first reflecting mirror 103 and the second reflecting mirror 104 as shown in FIG. 3B or FIG. 3D.

By oscillating the beam homogenizer 100 as shown in FIGS. 3A to 3D, the fringe oscillates in the x-direction at the exit of the beam homogenizer 100. As a result, intensity distribution of the laser beam LB in the x-direction is temporally averaged at the exit of the beam homogenizer 100; accordingly, a portion in which intensity is not sufficiently high can be eliminated from the intensity distribution of the laser beam LB in the x-direction.

As described above, in the optical system in FIG. 1, by oscillating the beam homogenizer 100 so that the fringe on the plane Pa by the beam homogenizer 100 oscillates in a direction perpendicular to a direction in which the laser beam LB is scanned on the plane Pa, intensity distribution of the laser beam LB in the direction perpendicular to the scanning direction can be temporally averaged. Therefore, by irradiating an object to be irradiated with a laser beam while scanning the laser beam in a predetermined one direction (the y-direction) with the optical system in FIG. 1, a temperature of the object can be raised uniformly, and thus action of irradiation with the laser beam LB can be brought to the object to be irradiated uniformly.

In order to make an effect that intensity distribution of a laser beam is temporally averaged be evident, an amplitude $d_{am}$ of oscillation of the first reflecting mirror 103 and the second reflecting mirror 104, that is, displacement of oscillation in one period is preferably approximately 10 μm as an upper limit and a wavelength of the laser beam LB as a lower limit. The amplitude $d_{am}$ of oscillation can be determined based on a magnification of the projection lens 101 and a pitch of a pattern of the fringe projected on the plane Pa when the first reflecting mirror 103 and the second reflecting mirror 104 are not oscillated. Note that in the case of oscillation, in which the reflecting surfaces of the first reflecting mirror 103 and the second reflecting mirror 104 are tilted, the amplitude $d_{am}$ is a maximum value of displacement of the ends of the first reflecting mirror 103 and the second reflecting mirror 104 in the x-direction (see FIGS. 3C and 3D).

In order to make an effect obtained by oscillating the beam homogenizer 100 be evident, one period of oscillation of the beam homogenizer 100 is preferably equal to or shorter than the time necessary for scanning the laser beam LB of a distance which is equal to the length of the laser beam LB in the y-direction on the plane Pa. Therefore, a relation of a frequency of oscillation $f_1$, the length of the laser beam LB in the y-direction on the plane Pa d, and a scanning velocity of the laser beam LB in the y-direction on the plane Pa V is preferably $f_1 \geq V/d$. Note that the frequency $f_1$ can be determined by this formula when the laser beam LB is a beam emitted from a continuous wave laser apparatus (hereinafter referred to as a CW laser apparatus) or a pseudo continuous wave laser apparatus (hereinafter referred to as a pseudo CW laser apparatus). When d is 20 μm and V is 500 mm/sec for example, by setting the frequency $f_1$ to be equal to or higher than 25,000 Hz, the effect obtained by oscillation of the beam homogenizer 100 becomes increasingly apparent.

When the laser beam LB is a beam emitted from a pulsed laser apparatus, a period of oscillation is preferably equal to or shorter than a pulse width τ of a laser. Therefore, when the frequency of oscillation $f_1$ is equal to or higher than the inverse of the pulse width τ, that is, when $f_1 \geq \tau^{-1}$ is satisfied, the effect obtained by oscillation of the beam homogenizer 100 can be evident.

Oscillated at a frequency of several hundred Hz or higher, the first reflecting mirror 103 and the second reflecting mirror 104 are structural objects which are lightweight and have strength so that the reflecting surfaces thereof are not distorted by oscillation. For the first reflecting mirror 103 and the second reflecting mirror 104, for example, a porous silicon thin plate, a ceramics thin plate of which a surface is coated with a reflective coating film, a plate of which an inside structure is a hollow structure or a honeycomb structure and of which a surface is coated with a reflective coating film, or the like can be used.

In the optical system in FIG. 1, when the first reflecting mirror 103 and the second reflecting mirror 104 are oscillated in the same direction, an optical axis of the beam homogenizer 100 also oscillates. In order to compensate oscillation of the optical axis of the beam homogenizer 100, the projection lens 101 is also oscillated. The projection lens 101 is oscillated while being synchronized with oscillations of the first reflecting mirror 103 and the second reflecting mirror 104, so that the irradiation region of the laser beam LB on the plane Pa is prevented from being oscillated. The projection lens 101 can be oscillated by attaching an oscillator formed of a piezoelectric element or the like to the projection lens 101.

A moving direction of the projection lens 101, and a period and an amplitude of oscillation of the projection lens 101 are set so that the irradiation region of the laser beam LB does not fluctuate on the plane Pa. A frequency of oscillation of the projection lens 101 $f_2$ is preferably equal to a frequency of oscillation of the first reflecting mirror 103 and the second reflecting mirror 104 $f_1$. The amplitude of oscillation of the projection lens 101 can be determined based on an amplitude of the first reflecting mirror 103 and the second reflecting mirror 104 and the magnification of the projection lens 101.

For an oscillator for oscillating the projection lens 101, a piezoelectric element can be used.

Embodiment Mode 2

Figure 4:
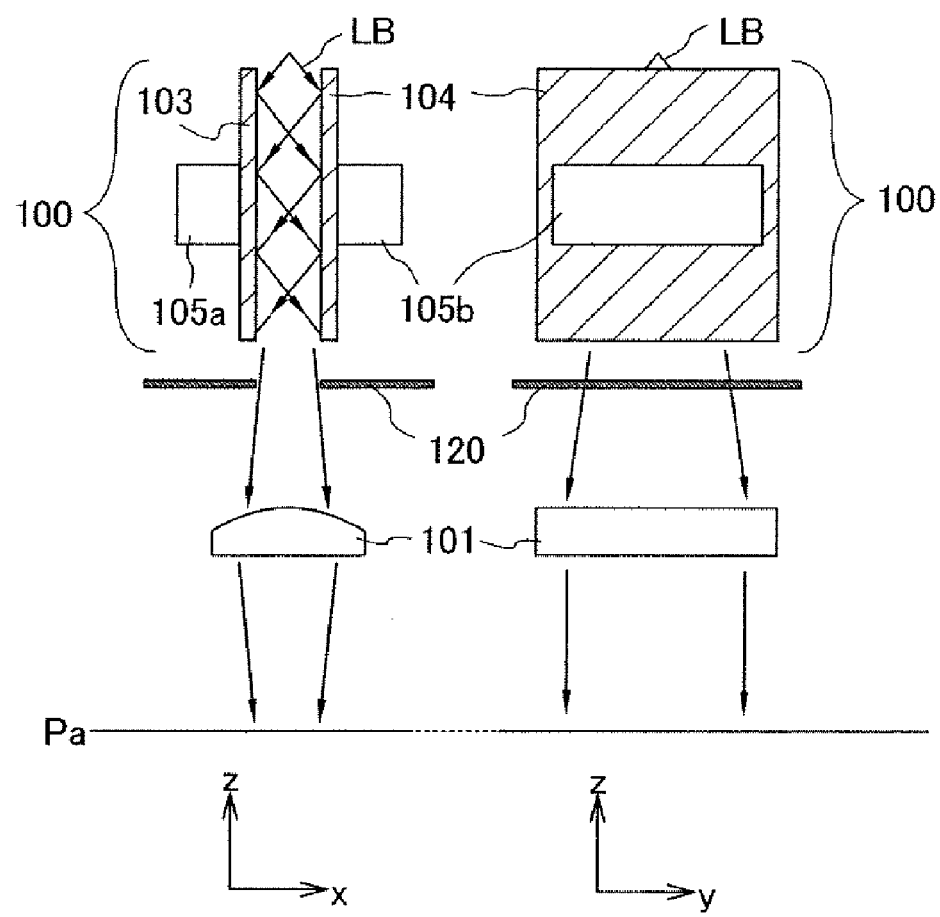
FIG. 4 is a plan view showing an x-z plane and a z-y plane of a structural example of an optical system including a beam homogenizer to be oscillated.

In this embodiment mode, an optical system having a beam homogenizer to be oscillated is described. FIG. 4 is a plan view of the optical system of this embodiment mode. In FIG. 4, a plan view taken along x-z is shown on the left side and a plan view taken along z-y is shown on the right side similarly to in FIG. 1. The optical system in FIG. 4 is also an optical system which has a surface to be irradiated, which is a plane parallel to an x-y plane, and performs scanning with a laser beam parallel in the y-direction.

The optical system in FIG. 4 corresponds to the optical system in FIG. 1 to which a slit 120 is added. The slit 120 is provided between the exit side of the beam homogenizer 100 and the projection lens 101. The projection lens 101 projects an image of the slit 120 on the plane Pa. Similarly to in the optical system in FIG. 1, in the optical system in FIG. 4, an object to be irradiated is irradiated with the laser beam LB while the beam homogenizer 100 is oscillated and scanning with the laser beam LB is performed in the y-direction, so that an adverse effect of interference in the homogenizer 100 can be suppressed to homogeneously heat the object to be irradiated.

In the optical system in FIG. 1, when the first reflecting mirror 103 and the second reflecting mirror 104 are oscillated in the same direction, the optical axis of the beam homogenizer 100 oscillates, and thus a position of a region to be irradiated also oscillates. When the first reflecting mirror 103 and the second reflecting mirror 104 are oscillated in different directions, the size of the exit of the beam homogenizer 100 changes, and thus a range of the region to be irradiated with the laser beam LB fluctuates. In the optical system in FIG. 4, the slit 120 is provided on the exit side of the beam homogenizer 100 so that the region to be irradiated is not changed due to oscillation of the beam homogenizer 100. The projection lens 101 is provided on an exit side of the slit 120. By the projection lens 101, the slit 120 and the plane Pa which is to be irradiated are in a conjugate relation.

A clearance of the slit 120 may be almost as long as distance between the first reflecting mirror 103 and the second reflecting mirror 104. In order that the laser beam LB passes through the slit 120 so that a portion in which intensity distribution is homogenized is selectively taken, the clearance of the slit 120 is determined in consideration of the amplitude $d_{am}$ of oscillation of the beam homogenizer 100 or a spread of the laser beam LB.

The ends of the laser beam LB emitted from the exit of the beam homogenizer 100 are shielded by the slit 120. The projection lens 101 projects an image of the slit 120 on the plane Pa. Since the slit 120 is not oscillated, the range and the position of the region to be irradiated with the laser beam LB on the plane Pa do not fluctuate even when the beam homogenizer 100 is oscillated. The laser beam LB passes through the slit 120 so that a portion in which intensity distribution is homogenized by oscillation of the beam homogenizer 100 is selectively taken from the laser beam LB; therefore, the object to be irradiated can be homogeneously heated by the laser beam LB.

Embodiment Mode 3

Figure 5:
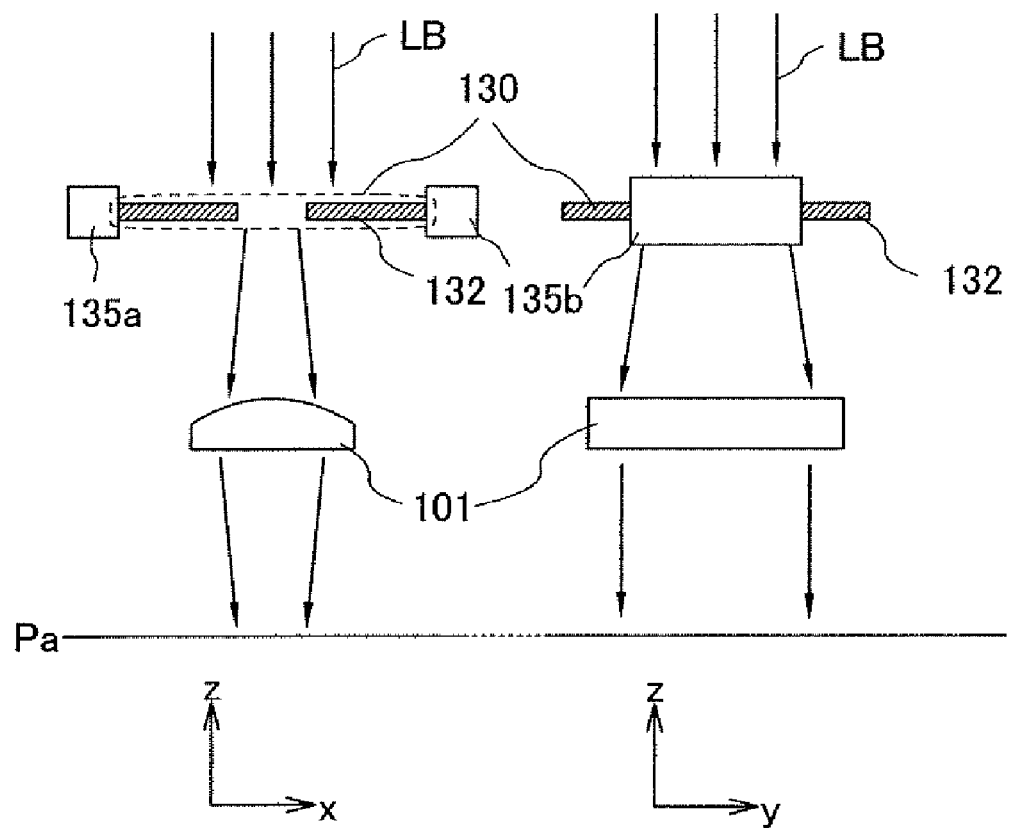
FIG. 5 is a plan view showing an x-z plane and a z-y plane of a structural example of an optical system including a slit to be oscillated.

In this embodiment mode, an optical system having a slit to be oscillated is described. FIG. 5 is a plan view of the optical system of this embodiment mode. In FIG. 5, a plan view taken along x-z is shown on the left side and a plan view taken along z-y is shown on the right side similarly to in FIG. 1. The optical system in FIG. 5 is also an optical system which has a surface to be irradiated, which is a plane parallel to an x-y plane, and scans a laser beam parallel in a y-direction.

As shown in FIG. 5, the optical system includes a slit 130 to be oscillated and the projection lens 101 provided on an exit side of the slit 130. The projection lens 101 is a lens for projecting an image of the slit 130 on the plane Pa. By the projection lens 101, the slit 130 and the plane Pa which is to be irradiated are in a conjugate relation.

The laser beam LB used for laser annealing is generally a laser beam of a single mode, and intensity distribution of the laser beam LB is Gaussian distribution. Therefore, intensity of the ends of the laser beam LB is insufficient for laser annealing. Since the ends of the laser beam LB, of which intensity is insufficient, are shielded by the slit 130, irradiation with the laser beam LB having a certain intensity or higher can be performed.

The slit 130 has shielding plates 131 and 132. The shielding plates 131 and 132 are provided so that a length of the laser beam LB in the x-direction is set on the plane Pa. The shielding plates 131 and 132 are provided leaving a space in an x-direction. The distance between the shielding plates 131 and 132 is preferably 500 μm to 5 mm. Oscillators 135a and 135b are attached to the shielding plates 131 and 132, respectively. Oscillations of the oscillators 135a and 135b are transferred to the shielding plates 131 and 132 respectively, so that the shielding plates 131 and 132 are oscillated. For the oscillators 135a and 135b, piezoelectric elements or the like can be used.

The laser beam LB passes through the slit 130 to be diffracted. Because of an effect of diffraction, intensity of the vicinity of the ends of the laser beam LB on the plane Pa might be lower or higher than necessary intensity. In the optical system in FIG. 5, by oscillating the slit 130 in the x-direction, intensity distribution of the vicinity of the ends of the laser beam LB in the x-direction on the plane Pa is temporally averaged; accordingly, intensity of the vicinity of the ends of the laser beam LB is prevented from being inhomogeneous. By performing scanning with the laser beam LB in the y-direction on the plane Pa, a temperature of a portion to be irradiated with the vicinity of the ends of the laser beam LB can also be raised sufficiently; accordingly, a temperature of a whole region irradiated with the laser beam LB can be raised uniformly.

That is, in the optical system in FIG. 5, the slit 130 is oscillated so that the ends of the laser beam LB oscillates on the plane Pa in a direction (the x-direction) perpendicular to a direction in which scanning with the laser beam LB is performed; consequently, an object to be irradiated is homogeneously heated by the laser beam LB.

Figure 6A:
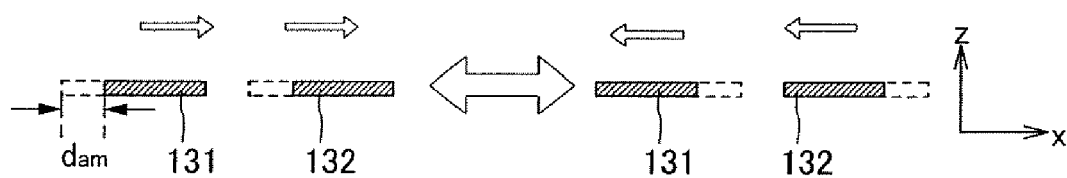
FIGS. 6A and 6B are explanatory diagrams showing oscillation of a slit.
Figure 6B:
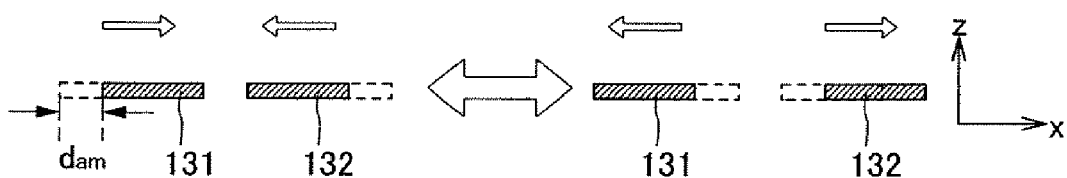

The shielding plates 131 and 132 are oscillated so as to be in a linear motion in the x-direction. In other words, the slit 130 is oscillated in a direction (the x-direction) perpendicular to a scanning direction of a laser beam (the y-direction). A moving direction of the shielding plate 131 may be the same as that of the shielding plate 132 as shown in FIG. 6A or may be opposite to that of the shielding plate 132 as shown in FIG. 6B. Note that oscillating the slit 130 (the shielding plates 131 and 132) in the same direction means moving the shielding plates 131 and 132 as shown in FIG. 6A. Note also that oscillating the slit 130 (the shielding plates 131 and 132) in different directions means moving the shielding plates 131 and 132 as shown in FIG. 6B.

In order to make an effect obtained by oscillating the slit 130 be evident, it is only necessary that a frequency $f_3$ and an amplitude $d_{am}$ of oscillation of the slit 130 be similar to those of the beam homogenizer 100 in FIG. 1. That is, a preferable range of the amplitude $d_{am}$ of the slit 130 is equal to or smaller than 10 μm and equal to or larger than a wavelength of the laser beam LB. As for the frequency $f_3$, $f_3 \geq V/d$ is preferably satisfied when the laser beam LB is emitted from a CW laser apparatus or a pseudo CW laser apparatus. d denotes the length of the laser beam LB in the y-direction on the plane Pa, and V denotes a scanning velocity of the laser beam LB in the y-direction on the plane Pa. When the laser beam LB is emitted from a pulsed laser apparatus, the frequency $f_3$ is preferably equal to or higher than the inverse of the pulse width τ, that is, $f_3 \geq \tau^{-1}$ is preferably satisfied.

When the slit 130 is oscillated in the same direction as shown in FIG. 6A, an optical axis of the slit 130 also oscillates; however, by oscillating the projection lens 101, oscillation of the optical axis of the slit 130 can be compensated. The projection lens 101 is oscillated while being synchronized with oscillation of the slit 130, so that the irradiation region of the laser beam LB on the plane Pa can be prevented from being oscillated.

A moving direction of the projection lens 101, and an amplitude and a frequency of oscillation of the projection lens 101 are set so that the irradiation region of the laser beam LB does not fluctuate on the plane Pa. A frequency of oscillation of the projection lens 101 may be equal to a frequency of oscillation of the slit. The amplitude of oscillation of the projection lens 101 can be determined based on the amplitude $d_{am}$ of oscillation of the slit and the magnification of the projection lens 101. The projection lens 101 can be oscillated by attaching an oscillator formed of a piezoelectric element or the like to the projection lens 101.

Embodiment Mode 4

Figure 7:
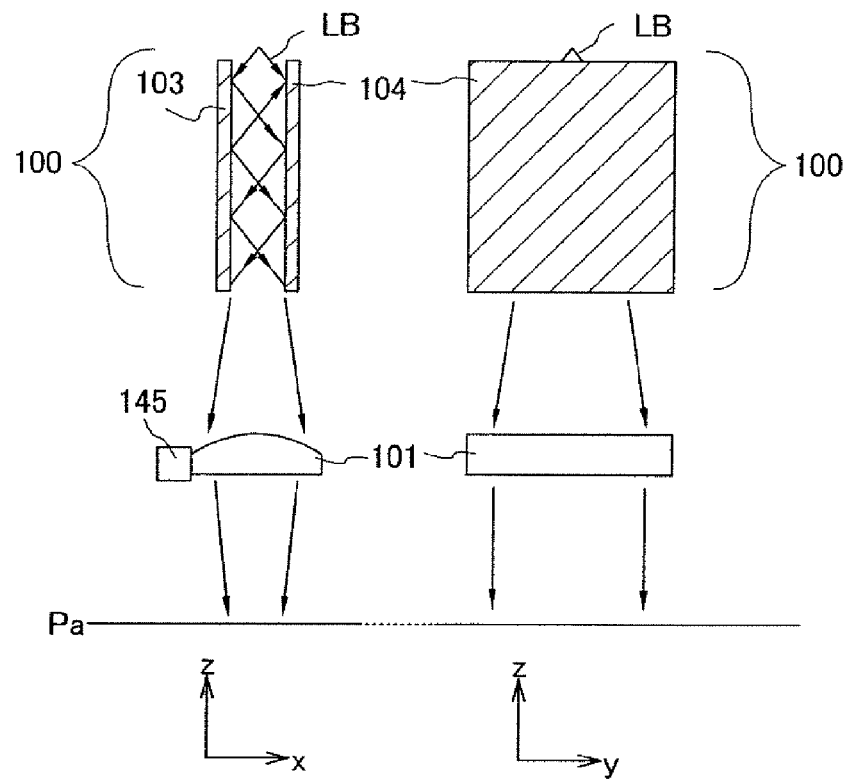
FIG. 7 is a plan view showing an x-z plane and a z-y plane of a structural example of an optical system including an oscillating projection lens.

In this embodiment mode, an optical system having a projection lens to be oscillated is described. FIG. 7 is a plan view of the optical system of this embodiment mode. In FIG. 7, a plan view taken along x-z is shown on the left side and a plan view taken along y-z is shown on the right side. An x-direction, a y-direction, and a z direction are perpendicular to one another. FIG. 7 shows the optical system which has a surface to be irradiated, which is a plane parallel to an x-y plane, and performs scanning with a laser beam parallel in the y-direction.

The optical system of this embodiment mode corresponds to the optical system in FIG. 1, in which the beam homogenizer 100 is fixed and only the projection lens 101 is oscillated. The optical system of this embodiment mode is different from the optical system in FIG. 1 in that oscillators 105a and 105b for oscillating the beam homogenizer 100 are detached and an oscillator 145 formed of a piezoelectric element or the like is attached to the projection lens 101 in order to oscillate the projection lens.

The laser beam LB passes through the beam homogenizer 100; thus, interference is caused and the projection lens 101 projects a fringe on the plane Pa. In the optical system in FIG. 7, the projection lens 101 is oscillated in the x-direction so that no a fringe in the x-direction is on the plane Pa. For oscillation of the projection lens 101, the projection lens 101 may be in a linear motion in the x-direction on the x-y plane.

By oscillating the projection lens 101 in a direction (the x-direction) perpendicular to a scanning direction, intensity distribution of the laser beam LB in the direction perpendicular to the scanning direction on the plane Pa can be temporally averaged. Therefore, by irradiating an object to be irradiated with the laser beam LB while scanning the laser beam LB in a predetermined one direction (the y-direction) with the optical system in FIG. 7, a temperature of the object to be irradiated can be raised uniformly, and thus action of irradiation with the laser beam LB can be brought to the object to be irradiated uniformly. By oscillating the projection lens 101, an effect similar to that of the optical system in FIG. 1 can be obtained.

In order to make an effect that intensity distribution of a laser beam is temporally averaged be evident, an amplitude $d_{am}$ of oscillation of the projection lens 101, that is, displacement of oscillation in one period is preferably set to be equal to approximately 10 μm as an upper limit and a wavelength of the laser beam LB as a lower limit. The amplitude $d_{am}$ of oscillation of the projection lens 101 may be a space of a fringe projected on the plane Pa when the projection lens 101 is not oscillated.

In order to make an effect that intensity distribution of a laser beam is temporally averaged be evident, as for the frequency of oscillation of the projection lens 101 $f_3$, $f_3 \geq V/d$ is preferably satisfied when the laser beam LB is emitted from a CW laser apparatus or a pseudo CW laser apparatus. d denotes the length of the laser beam LB in the y-direction on the plane Pa, and V denotes a scanning velocity of the laser beam LB in the y direction on the plane Pa. When the laser beam LB is emitted from a pulsed laser apparatus, the frequency $f_3$ is preferably equal to or higher than the inverse of the pulse width τ, that is, $f_3 \geq \tau^{-1}$ is preferably satisfied.

Embodiment Mode 5

Figure 8:
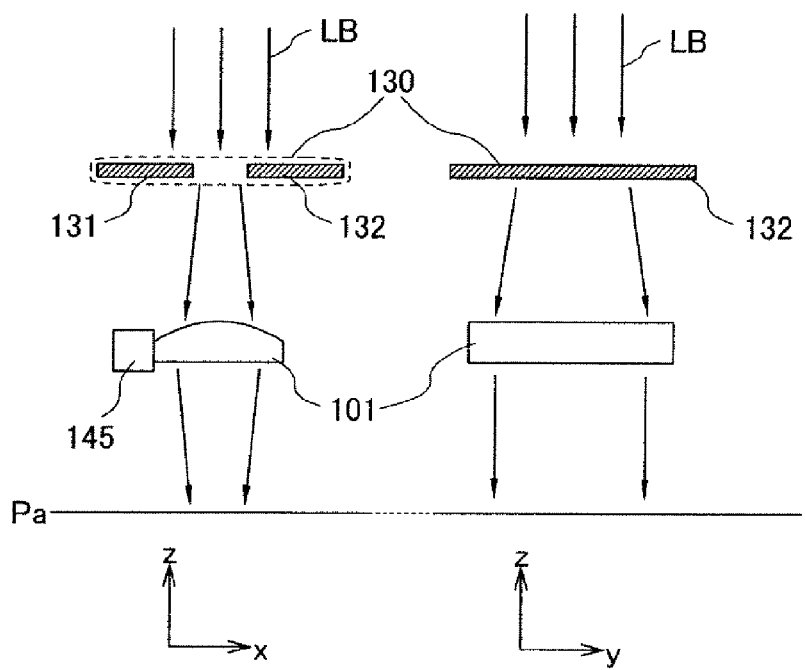
FIG. 8 is a plan view showing an x-z plane and a z-y plane of a structural example of an optical system including a projection lens to be oscillated.

In this embodiment mode, an optical system having a projection lens to be oscillated is described. FIG. 8 is a plan view of the optical system of this embodiment mode, and a plan view taken along x-z is shown on the left side and a plan view taken along y-z is shown on the right side. An x-direction, a y-direction, and a z-direction are perpendicular to one another FIG. 8 shows the optical system which has a surface to be irradiated, which is a plane parallel to an x-y plane, and performs scanning with a laser beam parallel in the y-direction.

The optical system of this embodiment mode corresponds to the optical system in FIG. 5, in which the slit 130 is fixed and only the projection lens 101 is oscillated. The optical system in FIG. 8 is different from the optical system in FIG. 5 in that oscillators 135a and 135b for oscillating the slit 130 are detached and the oscillator 145 formed of a piezoelectric element or the like is attached to the projection lens 101 in order to oscillate the projection lens.

Since the optical system in FIG. 8 includes the slit 130, intensity of the vicinity of the ends of the laser beam LB on the plane Pa might be lower or higher than necessary intensity because of an effect of diffraction in the slit 130. In the optical system in FIG. 8, the projection lens 101 is oscillated in the x-direction so that intensity distribution of the vicinity of the ends of the laser beam LB on the plane Pa is homogenized. That is, by oscillating the projection lens 101, an effect similar to that of the optical system in FIG. 5 can be obtained.

For oscillation of the projection lens 101, the projection lens 101 may be in a linear motion in the x-direction on the x-y plane. In the optical system in FIG. 8, by oscillating the projection lens 101 so that the ends of the laser beam LB oscillate on the plane Pa in a direction (the x-direction) perpendicular to a direction in which scanning with the laser beam LB is performed, intensity distribution of the vicinity of the ends of the laser beam LB in the x-direction on the plane Pa can be temporally averaged. Therefore, by irradiating an object to be irradiated with the laser beam LB while performing scanning with the laser beam LB in a predetermined one direction (the y-direction), a temperature of the object can be raised uniformly, and thus action of irradiation with the laser beam LB can be brought to the object to be irradiated uniformly.

In order to make an effect that intensity distribution of a laser beam is temporally averaged be evident, an amplitude $d_{am}$ of oscillation of the projection lens 101, that is, displacement of oscillation in one period is preferably set to be equal to approximately 10 μm as an upper limit and a wavelength of the laser beam LB as a lower limit. The amplitude $d_{am}$ of oscillation of the projection lens 101 may be a space of a fringe projected on the plane Pa when the projection lens 101 is not oscillated.

In order to make an effect that intensity distribution of a laser beam is temporally averaged be evident, as for the frequency of oscillation of the projection lens 101 $f_2$, $f_2 \geq V/d$ is preferably satisfied when the laser beam LB is emitted from a CW laser apparatus or a pseudo CW laser apparatus. d denotes the length of the laser beam LB in the y-direction on the plane Pa, and V denotes a scanning velocity of the laser beam LB in the y-direction on the plane Pa. When the laser beam LB is emitted from a pulsed laser apparatus, the frequency $f_2$ is preferably equal to or higher than the inverse of the pulse width τ, that is, $f_2 \geq \tau^{-1}$ is preferably satisfied.

A laser irradiation apparatus having the optical system shown in any of FIGS. 1, 4, 5, 7, and 8 can be used for a thermal treatment for crystallizing an amorphous material such as amorphous silicon. An amorphous material is crystallized by being irradiated with a laser beam through the optical system, so that a crystalline material having a homogeneous crystal structure can be obtained. For example, by crystallizing an amorphous silicon film, a crystalline silicon film having a homogeneous crystal structure and a large grain size can be formed.

Further, a laser irradiation apparatus having the optical system shown in any of FIGS. 1, 4, 5, 7, and 8 may be used for various thermal treatments such as a thermal treatment for activating an n-type impurity or a p-type impurity added to a semiconductor material, a thermal treatment for forming silicide by reacting silicon with a metal, and a laser scribing treatment, as well as a thermal treatment for crystallization.

In order to perform scanning with the laser beam LB in the optical system shown in any of FIGS. 1, 4, 5, 7, and 8, it is only necessary that the laser beam LB be relatively moved with respect to an object to be irradiated. Therefore, scanning with the laser beam LB can be performed by moving only the laser beam LB, by moving only the object to be irradiated, or by moving both of the laser beam LB and the object to be irradiated.

In the optical system shown in any of FIGS. 1, 4, 5, 7, and 8, a convex cylindrical lens is used as the projection lens 101 which is provided so as to condense a laser beam in the x-direction. Alternatively, a convex spherical lens may be used as the projection lens 101.

In the optical system having the beam homogenizer 100, which is shown in any of FIGS. 1, 4, and 7, a condenser lens having power at least in the x-direction is preferably provided on an entrance side of the beam homogenizer 100. The laser beam LB is condensed by the condenser lens, so that the laser beam LB can easily enter the beam homogenizer 100. As the condenser lens, for example, a convex cylindrical lens or a convex spherical lens is used.

Figure 9:
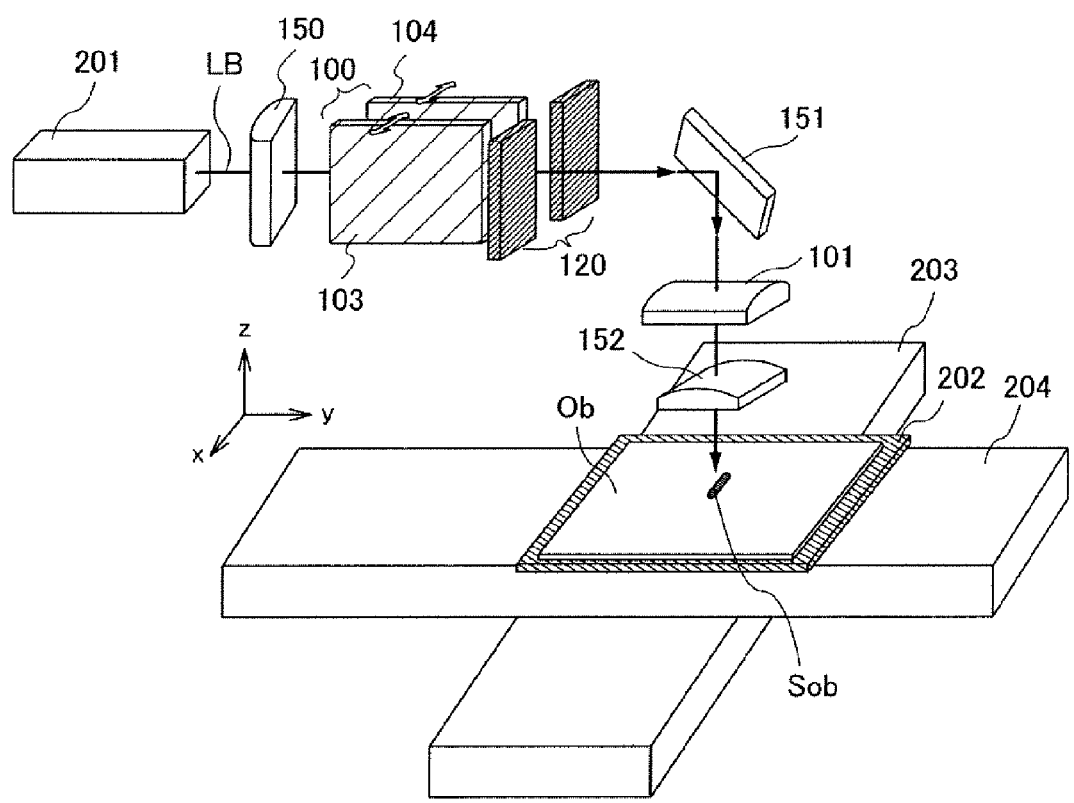
FIG. 9 is a three-dimensional perspective view showing a structural example of a laser irradiation apparatus including a beam homogenizer to be oscillated.

As shown in FIGS. 1 and 9, in the optical system having the beam homogenizer 100, a condenser lens to condense the laser beam LB in the y-direction on the plane Pa is preferably provided on the exit side of the beam homogenizer 100. In the optical system in FIG. 4, a condenser lens to condense the laser beam LB in the y-direction on the plane Pa is preferably provided on the exit side of the slit 120. In the optical system in FIG. 5, a condenser lens to condense the laser beam LB in the y-direction on the plane Pa is preferably provided on the exit side of the slit 130. By condensing the laser beam LB in the y-direction, intensity of the laser beam LB on the plane Pa can be increased and thus energy of the laser beam LB can be efficiently supplied to an object to be irradiated. The condenser lens may be provided on either an entrance side or an exit side of the projection lens 101. As the condenser lens, for example, a convex cylindrical lens or a convex spherical lens is used.

Embodiment 1

In this embodiment, a laser irradiation apparatus having a beam homogenizer to be oscillated in an optical system, and a laser irradiation method using a beam homogenizer to be oscillated are described. FIG. 9 shows a structural example of the laser irradiation apparatus of this embodiment. The optical system in FIG. 4 is applied to the optical system of the laser irradiation apparatus in FIG. 9. In FIG. 9, the same reference numerals as those in FIG. 4 denote common components. As described below, a y-direction is parallel to a scanning direction of a laser beam, and an x-direction is perpendicular to the scanning direction of the laser beam.

As shown in FIG. 9, the laser irradiation apparatus includes a laser oscillator 201, and a suction stage 202 which is a means for holding an object to be irradiated Ob. For the laser oscillator 201, a CW laser apparatus, a pseudo CW laser apparatus, or a pulsed laser is used.

The laser irradiation apparatus includes an X-stage 203 for moving the suction stage 202 in the x-direction and a Y-stage 204 for moving the suction stage 202 in the y-direction. By the X-stage 203 and the Y-stage 204, the object to be irradiated Ob is moved in two dimensions on the x-y plane. That is, the object to be irradiated Ob is moved by the X-stage 203 and the Y-stage 204, so that scanning with a beam spot $S_{ob}$ of a laser beam LB on a surface to be irradiated of the object to be irradiated Ob is performed on the x-y plane.

In the optical system of the laser irradiation apparatus, a condenser lens 150, the beam homogenizer 100, the slit 120, a deflecting mirror 151, the projection lens 101, and the condenser lens 152 are provided from an exit side of the laser oscillator 201. The projection lens 101 may be provided on an exit side of the condenser lens 152.

The beam homogenizer 100 includes the first reflecting mirror 103 and the second reflecting mirror 104 which are rectangular, and is provided so that intensity distribution of the beam Spot $S_{ob}$ in the x-direction is homogenized. The distance between the first reflecting mirror 103 and the second reflecting mirror 104 is preferably 500 μm to 1 mm. Oscillators are attached to the first reflecting mirror 103 and the second reflecting mirror 104 similarly to in FIG. 1. By oscillation of the oscillators, the first reflecting mirror 103 and the second reflecting mirror 104 oscillate in the x-direction, that is, a major axis direction of the beam spot $S_{ob}$.

The slit 120 is provided so as to shield both ends of the beam spot $S_{ob}$ in the x-direction. The deflecting mirror 151 is provided to deflect a light path of the laser beam LB. The deflecting mirror 151 is provided as appropriate at a position where the light path needs to be deflected. Therefore, in the optical system of the present invention, the position and the number of the deflecting mirror 151 are not limited to those in FIG. 9. The projection lens 101 is a lens for projecting the image of the slit 120 on the object to be irradiated Ob. By the projection lens 101, the slit 120 and the surface to be irradiated are in a conjugate relation. The condenser lens 152 is a lens for condensing the laser beam LB in the y-direction, that is, a minor axis direction of the beam spot $S_{ob}$ to shape the beam spot $S_{ob}$.

In the optical system in FIG. 9, convex cylindrical lenses are used as the projection lens 101 and the condenser lenses 150 and 152. The condenser lens 150 is provided so that the laser beam LB is condensed in the x-direction to shape the beam spot $S_{ob}$. The condenser lens 150 is a lens for condensing the laser beam LB so that the laser beam LB enters the beam homogenizer 100. The projection lens 101 is a lens for projecting the image of the slit 120 on the object to be irradiated Ob, and provided so that the laser beam LB is condensed in the x-direction to shape the beam Spot $S_{ob}$. The condenser lens 152 is a lens for condensing the laser beam LB in the y-direction to shape the beam spot $S_{ob}$. By the condenser lens 152, the laser beam LB is condensed in the minor axis direction to shape the beam spot $S_{ob}$. By condensing the laser beam LB in the y-direction to shape the beam spot $S_{ob}$, heat energy can be efficiently supplied to the object to be irradiated Ob.

The laser beam LB emitted from the laser oscillator 201 is condensed by the condenser lens 150 and then enters the beam homogenizer 100. The laser beam LB which has entered the beam homogenizer 100 propagates through a space between the first reflecting mirror 103 and the second reflecting mirror 104 while being reflected by the first reflecting mirror 103 and the second reflecting mirror 104, and intensity distribution in the x-direction is homogenized. Further, since the first reflecting mirror 103 and the second reflecting mirror 104 are oscillated in the x-direction, intensity distribution in the x-direction at the exit of the beam homogenizer 100 is temporally averaged. That is, at the exit of the beam homogenizer 100, periodical intensity distribution in accordance with interference of the laser beam LB is homogenized. The condition for oscillations of the first reflecting mirror 103 and the second reflecting mirror 104 is as described in Embodiment Mode 1. A frequency of oscillation is optimized depending on a kind of laser used for the laser oscillator 201: a CW laser apparatus, a pseudo CW laser apparatus, or a pulsed laser apparatus.

The laser beam LB emitted from the beam homogenizer 100 passes through the slit 120, so that the ends of the laser beam LB are shielded. After being deflected by the deflecting mirror 151, the laser beam LB which has passed through the slit 120 is condensed in the x-direction by the projection lens 101 and in the y-direction by the condenser lens 152, and the object to be irradiated Ob is irradiated with the laser beam LB. The object to be irradiated is irradiated with the laser beam LB while the beam spot $S_{ob}$ is scanned in the y-direction by the Y-stage 204.

The laser beam LB is processed so that the length of the beam Spot $S_{ob}$ in the x-direction is longer than that in the y-direction on the surface to be irradiated by passing through the optical system in FIG. 9. More specifically, the beam spot $S_{ob}$ has a linear shape, an elliptical shape, or a rectangular shape. Note that in the optical system in FIG. 9, the beam spot $S_{ob}$ preferably has a shape of which an aspect ratio (the length in the x-direction/the length in the y-direction) is equal to or larger than 10. The aspect ratio is more preferably equal to or larger than 100.

In the laser irradiation apparatus in FIG. 9, intensity distribution of the beam spot $S_{ob}$ in a direction (the x-direction, the major axis direction of the beam spot $S_{ob}$) perpendicular to the scanning direction of the laser beam LB is homogenized in the beam homogenizer 100. Therefore, by scanning the beam spot $S_{ob}$ in a predetermined one direction (the y-direction, the minor axis direction of the beam spot $S_{ob}$), the object to be irradiated Oh can be heated homogeneously and thus a temperature of the object can be raised uniformly.

Note that in this embodiment, a structural example of an optical system to which the optical system in FIG. 4 (Embodiment Mode 6) is applied is described; however, the optical system in FIG. 1 may be applied. In order to apply the optical system in FIG. 1, the slit 120 is preferably eliminated in FIG. 9. In this case, the projection lens 101 is provided so that the exit of the beam homogenizer 100 and the surface to be irradiated are in a conjugate relation. In order to oscillate the beam homogenizer 100 in the same direction, an oscillator is preferably attached to the projection lens 101. By oscillating the projection lens 101 in the x-direction along with the beam homogenizer 100, the beam spot $S_{ob}$ can be prevented from oscillating.

Embodiment 2

Figure 10:
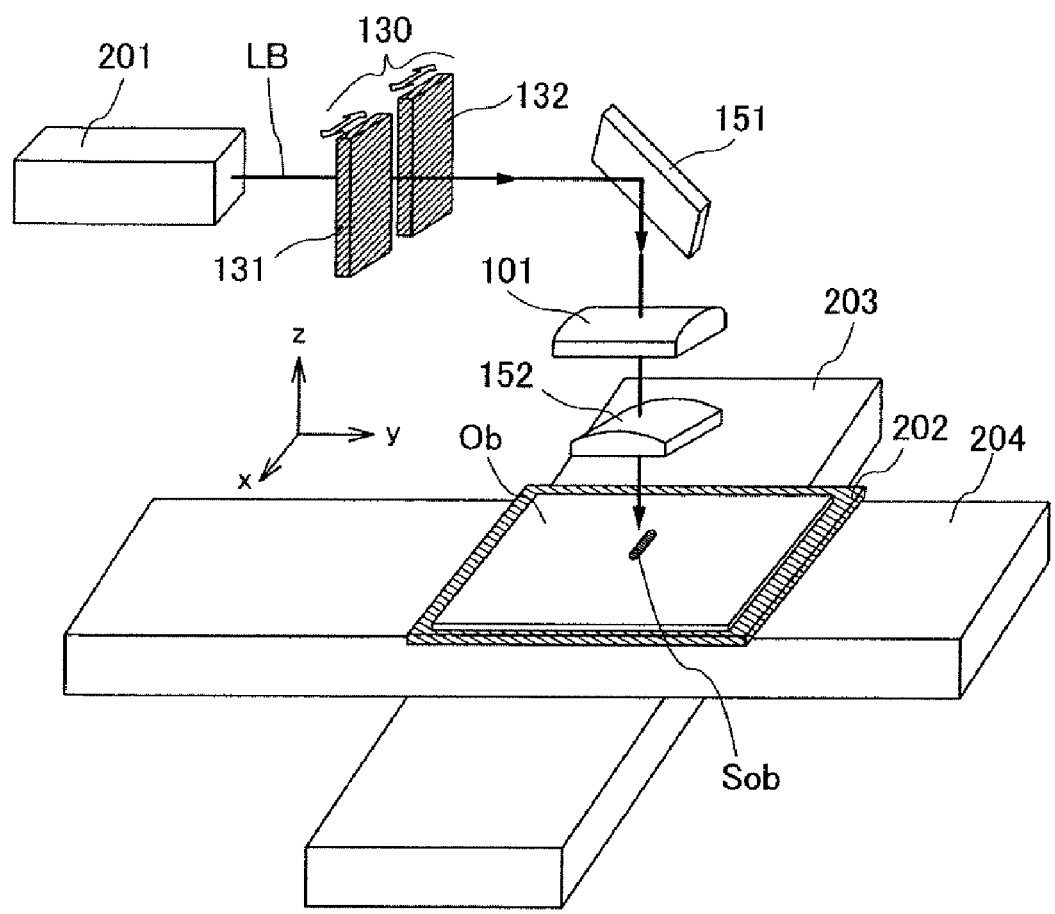
FIG. 10 is a three-dimensional perspective view showing a structural example of a laser irradiation apparatus including a slit to be oscillated.

In this embodiment, a laser irradiation apparatus having a slit to be oscillated in an optical system, and a laser irradiation method using a slit to be oscillated are described. FIG. 10 shows a structural example of the laser irradiation apparatus of this embodiment. The optical system in FIG. 5 is applied to the optical system of the laser irradiation apparatus in FIG. 10. In FIG. 10, the same reference numerals as those in FIGS. 5 and 9 denote common components. In the laser irradiation apparatus in FIG. 10 similarly to that in FIG. 9, a y-direction is parallel to a scanning direction of a laser beam, and an x-direction is perpendicular to the scanning direction of a laser beam.

As shown in FIG. 10, the laser irradiation apparatus includes the laser oscillator 201, the suction stage 202, the X-stage 203, and the Y-stage 204.

In the optical system of the laser irradiation apparatus, the slit 130 to be oscillated in the x-direction, the deflecting mirror 151, the projection lens 101, and the condenser lens 152 are provided in this order from the exit side of the laser oscillator 201. Note that the projection lens 101 may be provided on the exit side of the condenser lens 152. The deflecting mirror 151 is provided as appropriate in a position where the light path needs to be deflected. Therefore, in the optical system of the present invention, the position and the number of the deflecting mirror 151 are not limited to those in FIG. 10.

The slit 130 has the shielding plates 131 and 132. The shielding plates 131 and 132 are provided so as to shield both ends of the beam spot $S_{ob}$ in the x-direction. Oscillators are attached to the shielding plates 131 and 132, and the shielding plates are oscillated in the x-direction by the oscillators.

In FIG. 10, convex cylindrical lenses are used as the projection lens 101 and the condenser lens 152. The projection lens 101 is a lens for projecting the image of the slit 130 on the object to be irradiated Ob, and provided so as to condense the laser beam LB in the x-direction to shape the beam spot $S_{ob}$. The projection lens 101 is provided so that the slit 130 and a surface to be irradiated are in a conjugate relation. The condenser lens 152 is a lens for condensing the laser beam LB in the y-direction to shape the beam spot $S_{ob}$.

The ends in the x-direction of the laser beam LB emitted from the laser oscillator 201 are shielded by the slit 130. After being deflected by the deflecting mirror 151, the laser beam LB which has passed through the slit 130 is condensed in the x-direction by the projection lens 101 and in the y-direction by the condenser lens 152, and the object to be irradiated Ob is irradiated with the laser beam LB. The object to be irradiated is irradiated with the laser beam LB while the laser beam spot $S_{ob}$ is scanned in the y-direction by the Y-stage 204.

The laser beam LB is processed so that the length of the beam spot $S_{ob}$ in the x-direction is longer than that in the y-direction on the surface to be irradiated by passing through the optical system in FIG. 10. More specifically, the beam Spot $S_{ob}$ has a linear shape, an elliptical shape, or a rectangular shape. Note that in the optical system in FIG. 10, the beam spot $S_{ob}$ preferably has a shape of which an aspect ratio (the length in the y-direction/the length in the x-direction) is equal to or larger than 10. The aspect ratio is more preferably equal to or larger than 100.

Because of diffraction of the slit 130, intensity of the vicinity of the ends of the beam spot $S_{ob}$ is affected. However, by oscillating the slit 130, intensity distribution of the vicinity of the ends of the beam spot $S_{ob}$ in the x-direction is temporally averaged; accordingly, intensity of the vicinity of the ends of the beam spot $S_{ob}$ is prevented from being insufficiently or excessively high. The condition for oscillation of the slit 130 is as described in Embodiment Mode 3. A frequency of oscillation is optimized depending on a kind of laser used for the laser oscillator 201: a CW laser apparatus, a pseudo CW laser apparatus, or a pulsed laser apparatus.

That is, in the optical system in FIG. 10, the slit 130 is oscillated so that an image of the slit 130 oscillates on the surface to be irradiated, in a direction (the x-direction, the major axis direction of the beam spot $S_{ob}$) perpendicular to the scanning direction of the laser beam LB, while the beam spot $S_{ob}$ is scanned in a predetermined one direction (the y-direction, the minor axis direction of the beam Spot $S_{ob}$). Thus, the object to be irradiated Ob can be heated homogeneously.

Note that when the slit 130 is oscillated in the same direction, the projection lens 101 is synchronized with the slit 130 so as to be oscillated; thus, deviation of the optical axis of the slit 130 can be compensated as described in Embodiment Mode 3.

Embodiment 3

Figure 11:
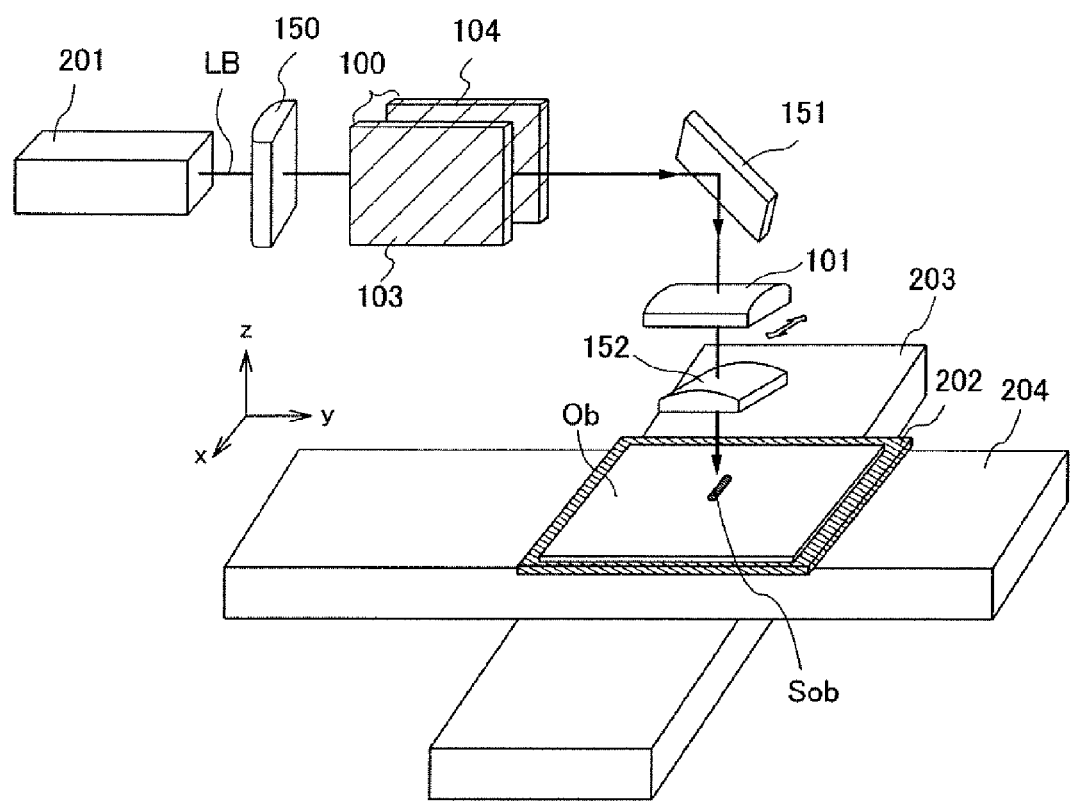
FIG. 11 is a three-dimensional perspective view showing a structural example of a laser irradiation apparatus including a slit to be oscillated.
Figure 12A:
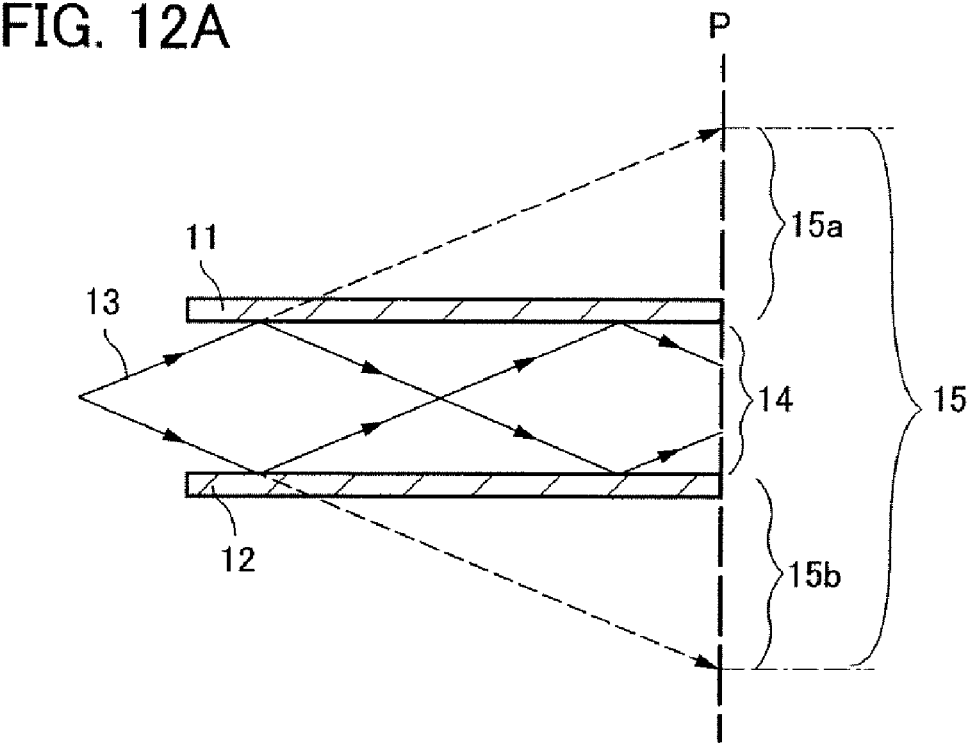
FIGS. 12A and 12B are plan views of a beam homogenizer described in Patent Document 1.
Figure 12B:
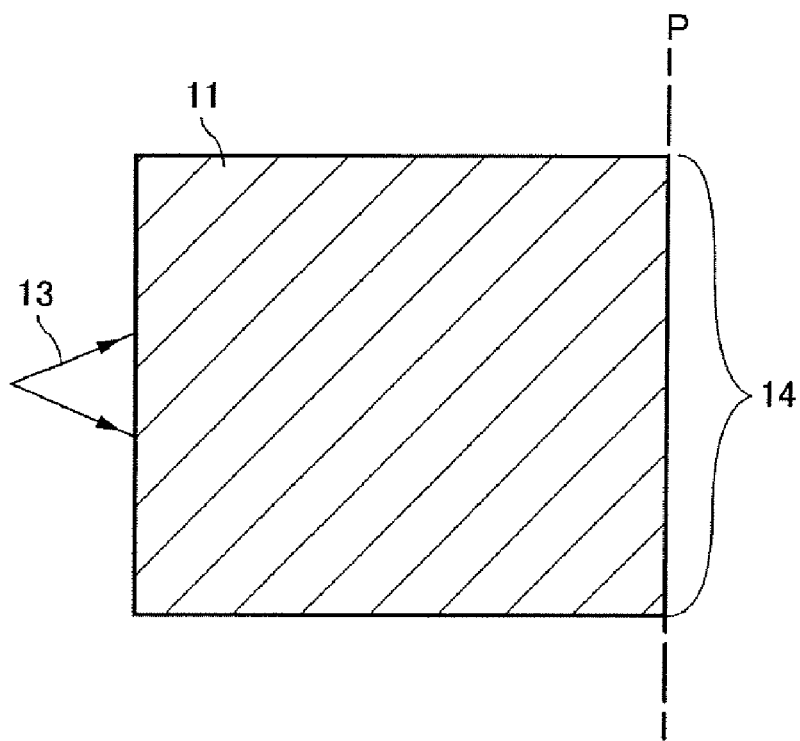

In this embodiment, a laser irradiation apparatus having a projection lens to be oscillated in an optical system, and a laser irradiation method using a projection lens to be oscillated are described. FIG. 11 shows a structural example of the laser irradiation apparatus of this embodiment. The optical system in FIG. 7 is applied to the optical system of the laser irradiation apparatus in FIG. 11. In FIG. 11, the same reference numerals as those in FIGS. 7 and 9 denote common components. In the laser irradiation apparatus in FIG. 7 similarly to that in FIG. 9, a y-direction is parallel to a scanning direction of a laser beam, and an x-direction is perpendicular to the scanning direction of a laser beam.

As shown in FIG. 11, the laser irradiation apparatus includes the laser oscillator 201, the suction stage 202, the X-stage 203, and the Y-stage 204.

In the optical system of the laser irradiation apparatus, the slit 130 which is fixed, the deflecting mirror 151, the projection lens 101, and the condenser lens 152 are provided in this order from the exit side of the laser oscillator 201. Note that the projection lens 101 may be provided on the exit side of the condenser lens 152. The deflecting mirror 151 is provided as appropriate at a position where the light path needs to be deflected. Therefore, in the optical system of the present invention, the position and the number of the deflecting mirror 151 are not limited to those in FIG. 11.

An oscillator is attached to the projection lens 101 similarly to in FIG. 7, and the projection lens 101 is oscillated in the x-direction by the oscillator. The condition for oscillation of the projection lens 101 is as described in Embodiment Mode 4. A frequency of oscillation is optimized depending on a kind of laser used for the laser oscillator 201: a CW laser apparatus, a pseudo CW laser apparatus, or a pulsed laser apparatus.

The laser beam LB is processed so that the length of the beam spot $S_{ob}$ in the x-direction is longer than that in the y-direction on a surface to be irradiated by passing through the optical system in FIG. 11 similarly to the case of the optical system in FIG. 9. More specifically, the beam spot $S_{ob}$ has a linear shape, an elliptical shape, or a rectangular shape. Note that in the optical system in FIG. 10, the beam spot $S_{ob}$ preferably has a shape of which an aspect ratio (the length in the y-direction/the length in the x-direction) is equal to or larger than 10. The aspect ratio is more preferably equal to or larger than 100.

Because of diffraction of the slit 130, intensity of the vicinity of the ends of the beam spot $S_{ob}$ is affected to be inhomogeneous. However, by oscillating the projection lens 101, intensity distribution of the vicinity of the ends of the beam spot $S_{ob}$ in the x-direction is temporally averaged similarly to the case of the laser irradiation apparatus in FIG. 9; accordingly, intensity of the vicinity of the ends of the beam spot $S_{ob}$ is prevented from being inhomogeneous.

In the optical system in FIG. 11, the projection lens 101 is oscillated in a direction (the x-direction, a major axis direction of the beam spot $S_{ob}$) perpendicular to the scanning direction of the laser beam LB while the laser beam LB is scanned in a predetermined one direction (the y-direction, a minor axis direction of the beam spot $S_{ob}$), so that the beam spot $S_{ob}$ is oscillated in the direction (the x-direction, the major axis direction of the beam spot $S_{ob}$) and thus intensity distribution of the vicinity of the ends of the beam spot $S_{ob}$ is homogenized. Accordingly, the object to be irradiated Ob can be heated homogeneously in the laser irradiation apparatus in FIG. 11.

Note that in this embodiment, a laser irradiation apparatus including the optical system in FIG. 7 is described as a laser irradiation apparatus including a projection lens to oscillate; however, the optical system in FIG. 8 may be applied to the laser irradiation apparatus. In this case, in the laser irradiation apparatus shown in FIG. 10, the oscillator of the slit 130 is detached and an oscillator is attached to the projection lens 101 so that the projection lens 101 can be oscillated in the x-direction. The condition for oscillation of the projection lens 101 is similar to that in Embodiment Mode 5. Thus, by changing the structure of the laser irradiation apparatus in FIG. 10, the object to be irradiated Ob may be heated homogeneously similarly to the case of the laser irradiation apparatus in FIG. 10.

This application is based on Japanese Patent Application serial no. 2006-311077 fled with Japan Patent Office on Nov. 17, 2006, the entire contents of which are hereby incorporated by reference.

What is claimed is:

1. A beam homogenizer comprising:
a pair of mirrors provided parallel to a direction of a laser beam travels, each having a reflecting surface facing each other; and
means for vibrating the pair of mirrors at a first frequency while the laser beam passes through a laser input portion of the pair of mirrors to a laser output portion of the pair of mirrors.

2. The beam homogenizer according to claim 1, wherein the means for vibrating the pair of mirrors includes a piezoelectric element.

3. The beam homogenizer according to claim 1, wherein the laser beam is emitted from a continuous wave laser oscillator, when a scanning velocity of the laser beam on a surface to be irradiated is V, a length in a scanning direction of the laser beam on the surface to be irradiated is d, and the first frequency is $f_1$, the $f_1$ satisfies $f_1 \geq V/d$.

4. A laser irradiation apparatus comprising:
a laser oscillator outputting a laser beam;
a beam homogenizer provided on an exit side of the laser oscillator, wherein the beam homogenizer including:
   a pair of mirrors provided parallel to a direction of the laser beam travels, each having a reflecting surface facing each other;
   means for vibrating the pair of mirrors at a first frequency while the laser beam passes through a laser input portion of the pair of mirrors to a laser output portion of the pair of mirrors; and
a projection lens provided on an exit side of the beam homogenizer.

5. The laser irradiation apparatus according to claim 4, wherein the means for vibrating the pair of mirrors includes a piezoelectric element.

6. The laser irradiation apparatus according to claim 4, wherein the laser output portion of the beam homogenizer and a surface to be irradiated are optically in a position of conjugate relation by the projection lens.

7. The laser irradiation apparatus according to claim 4,
wherein the laser beam has a wavelength being smaller than an amplitude of vibration of the pair of mirrors, and
wherein the amplitude of vibration of the pair of mirrors is equal to or smaller than 10 μM.

8. The laser irradiation apparatus according to claim 4, wherein the laser beam is emitted from a continuous wave laser oscillator, when a scanning velocity of the laser beam on a surface to be irradiated is V, a length in a scanning direction of the laser beam on the surface to be irradiated d, and the first frequency is $f_1$, the $f_1$ satisfies $f_1 \geq V/d$.

9. The laser irradiation apparatus according to claim 4, wherein the projection lens is vibrated at a second frequency.

10. The laser irradiation apparatus according to claim 9,
wherein the laser beam is emitted from a continuous wave laser oscillator,
when a scanning velocity of the laser beam on a surface to be irradiated is V,
and a length in a scanning direction of the laser beam on the surface to be irradiated d, and
the second frequency is $f_2$,
the $f_2$ satisfies $f_2 \geq V/d$.

11. The laser irradiation apparatus according to claim 4, further comprising a slit provided between the beam homogenizer and the projection lens along with an optical path.

12. A laser irradiation method comprising:
passing a laser beam through a beam homogenizer; and
irradiating an object to be irradiated with the laser beam,
wherein the beam homogenizer includes a pair of mirrors provided parallel to a direction of the laser beam travels, each having a reflecting surface facing each other,
wherein irradiation with the laser beam is performed while the pair of mirrors of the beam homogenizer is vibrated at a first frequency.

13. The laser irradiation method according to claim 12, wherein the laser beam which has passed through the beam homogenizer passes through an oscillating projection lens.

14. The laser irradiation method according to claim 12, wherein the laser beam which has passed through the beam homogenizer passes through an oscillating projection lens; and
wherein the laser beam is emitted from a continuous wave laser oscillator, when a scanning velocity of the laser beam on a surface to be irradiated is V, a length in a scanning direction of the laser beam on the surface to be irradiated d, and the first frequency is $f_1$,
the $f_1$ satisfies $f_1 \geq V/d$.

15. A laser irradiation method comprising:
entering a laser beam into a beam homogenizer;
shielding ends of the laser beam emitted from the beam homogenizer; and
irradiating an object to be irradiated with the laser beam of which the ends are shielded,
wherein the beam homogenizer includes a pair of mirrors provided parallel to a direction of the laser beam travels, each having a reflecting surface facing each other; and
wherein irradiation with the laser beam is performed while the pair of mirrors of the beam homogenizer is vibrated at a first frequency.

16. The laser irradiation method according to claim 15,
wherein the laser beam has a wavelength being smaller than an amplitude of vibration of the pair of mirrors, and
wherein the amplitude of vibration of the pair of mirrors is equal to or smaller than 10 μm.

17. The laser irradiation method according to claim 15, wherein the laser beam is emitted from a continuous wave laser oscillator, when a scanning velocity of the laser beam on a surface to be irradiated is V, a length in a scanning direction of the laser beam on the surface to be irradiated d, and the first frequency is $f_1$,
the $f_1$ satisfies $f_1 \geq V/d$.

* * * * *

UNITED STATES PATENT AND TRADEMARK OFFICE
CERTIFICATE OF CORRECTION

PATENT NO. : 8,237,085 B2  
APPLICATION NO. : 11/939649  
DATED : August 7, 2012  
INVENTOR(S) : Koichiro Tanaka Page 1 of 1

It is certified that error appears in the above-identified patent and that said Letters Patent is hereby corrected as shown below:

In the Specification:

Col. 14, line 51, "the beam Spot" should read "the beam spot"

Col. 15, line 15, "the beam Spot" should read "the beam spot"

Col. 15, line 54, "beam Spot $S_{ob}$" should read "beam spot $S_{ob}$"

Col. 16, line 3, "irradiated Oh can be" should read "irradiated Ob can be"

Col. 17, line 7, "Spot $S_{ob}$ has a" should read "spot $S_{ob}$ has a"

Col. 17, line 29, "beam Spot $S_{ob}$" should read "beam spot $S_{ob}$"

Col. 18, line 52, "2006-311077 fled with" should read "2006-311077 filed with"

In the Claims:

Col. 19, line 33, "equal to or smaller than 10 μM" should read "equal to or smaller than 10 μm"

Signed and Sealed this  
Thirteenth Day of November, 2012

David J. Kappos  
*Director of the United States Patent and Trademark Office*